Feb. 10, 1942.            L. J. SMITH            2,272,485
                              RELAY
                       Filed July 20, 1938
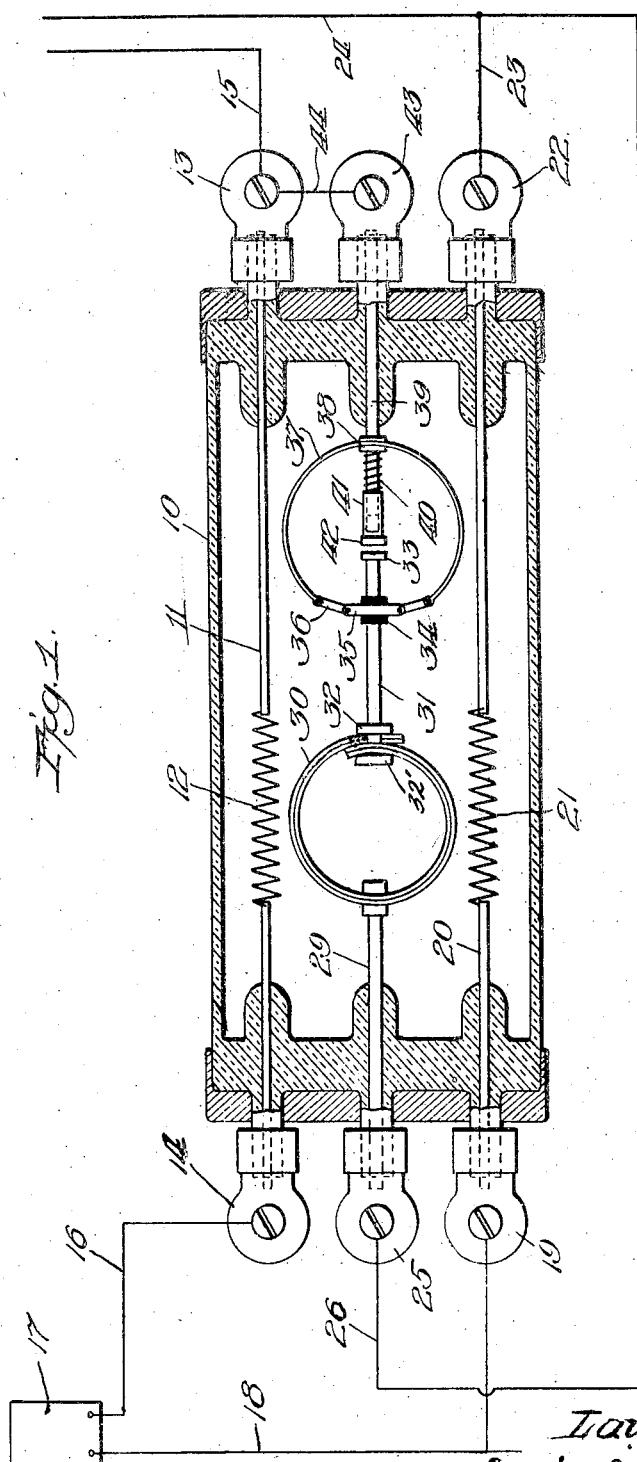
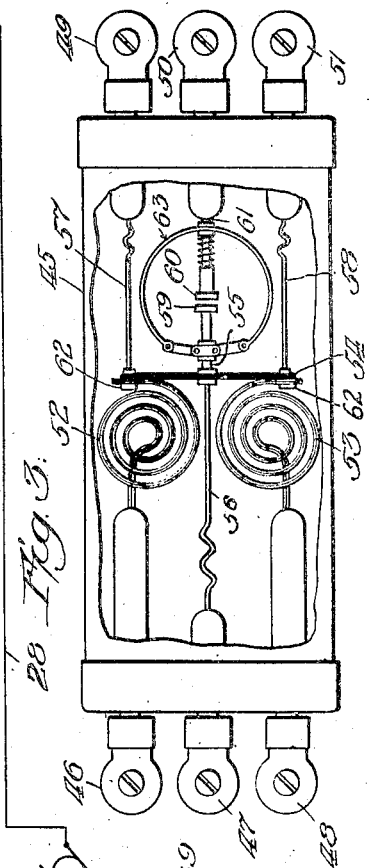
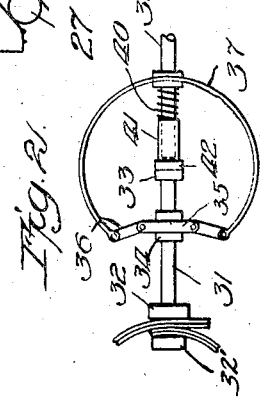
Inventor:
Lawrence J. Smith
By Davis, Lindsey, Smith & Shonts
Attys Patented Feb. 10, 1942

2,272,485

UNITED STATES PATENT OFFICE 2,272,485

RELAY

Lawrence J. Smith, Oak Park, Ill.

Application July 20, 1938, Serial No. 220,168

2 Claims. (Cl. 236—68)

My invention relates to relays and more particularly to a device for controlling a line voltage circuit by an electrically connected, low voltage circuit.

While not restricted thereto, my improved relay possesses special value in connection with hot water heating systems. In such installations, the temperature of the boiler water is ordinarily maintained by a firing means under the control of a boiler aquastat and circulation of this hot water through the system is effected by a pump whose operation is controlled by a room thermostat. The pump is ordinarily motor driven at line voltage, but a considerably lower voltage can be and usually is applied to the room thermostat, approximately twenty-five volts or less, with a considerable saving in installation cost, since it is unnecessary to connect the thermostat to the remainder of the circuit by armored cable or through steel conduit. In alternating current circuits, the required voltage reduction is accomplished by employing a transformer and connecting this unit with the ordinary relay. If direct current is used, either a number of batteries must be relied upon to energize the holding coil of the circuit when the room thermostat closes, or line voltage must be applied to the thermostat directly or reduced by passage through a resistance.

It is therefore one object of my invention to devise a relay which may be employed with either alternating or direct current and which, in addition to its ordinary relay function of determining the operation of the controlled circuit by a condition occurring in the controlling circuit, also acts to reduce the voltage applied to the last-noted circuit.

A further object is to provide a relay of the character indicated in which the closing of the controlled circuit is effected by the combined action of heat emitted by a voltage reducing element provided in the controlling circuit and a thermally actuated element located in the controlled circuit.

A further object is to provide a relay in which the voltage reducing and thermal actuated functions are combined in a single element.

These and further objects of my invention will be set forth in the following specification, reference being had to the accompanying drawing, and the novel means by which said objects are effectuated will be definitely pointed out in the claims.

In the drawing:

Figure 1 is a sectional elevation of my improved relay shown connected to a typical circuit, the switch elements of the relay being open.

Fig. 2 is a fragmentary elevation of the relay showing the switch elements closed.

Fig. 3 is an elevation of a modified type of relay, with parts broken away, and showing the voltage reducing and thermal actuated functions of the relay combined in a single element.

Referring to Figs. 1 and 2 of the drawing, the numeral 10 designates the casing of a cartridge type relay which is shown by way of illustration only, the casing in the present instance being of glass, although it may be composed of other materials. The casing is completely enclosed and the atmosphere within the casing is preferably exhausted, or the interior thereof may be filled with any of the inert gases customarily employed in mercury tube switches or electric light bulbs in order to prevent oxidation of the switch contacts of the device. It is contemplated, however, that all of the operating elements of my relay may be exposed to the air without affecting the elementary inventive conception involved.

A wire 11 including a resistance 12 is disposed within the casing 10 and the ends of this wire are sealed through the end walls of the casing for electrical connection to terminals 13 and 14. The terminal 13 is connected by a wire 15 to a source of electrical energy having the usual line voltage, say about 110 volts, while the terminal 14 is connected by a wire 16 to a room thermostat 17 which may be positioned to receive heat from the usual room radiator. The thermostat is also connected by a wire 18 to a terminal 19 having electrical connection with one end of a wire 20 that is sealed through the adjacent wall of the casing 10, then extends across the interior of the casing and is sealed through the opposite end wall for electrical connection to a terminal 22 that in turn is connected by a wire 23 to a wire 24, thus completing the electrical circuit between the room thermostat and the source of electrical power. In the type of relay shown, the wire 20 includes a resistance 21, comparable to the resistance 12, and, where two of such resistances are employed, they may occupy the spaced relation shown for a purpose presently explained. It is contemplated, however, that only one resistance may be used, since its purpose is to reduce the line voltage to a point enabling the use of ordinary wiring for the wires 16 and 18, and also to emit sufficient heat to operate the thermal actuated element hereinafter described. In a typical alternating circuit installation, the line voltage may be approximately 110 volts, and the resistances 12 and 21 may then be adjusted to provide for a voltage reduction down to 25 volts or less for application to the room thermostat.

A terminal 25 is mounted on the casing 10 between the terminals 14 and 19 and is connected by a wire 26 to a motor 27 which operates the circulating pump in the heating system, and which generically represents any electrically operated device that the relay is intended to control in the same way that the room thermostat 17 broadly represents the controlling element of the arrangement. The motor 27 is connected by a wire 28 to the power wire 24.

The terminal 25 is electrically connected to one end of a conductor that is sealed through the adjacent end wall of the casing and within this casing has mounted thereon and in electrical connection therewith the intermediate portion of a bimetallic strip element 30 which may have the generally circular shape as indicated in Fig. 1, or any other desired configuration. The element 30 may be composed of any of the customary metals ordinarily employed for this purpose, but with the metallic strip having the highest coefficient of thermal expansion located interiorly of the element so as to provide for the movement of the element as presently explained. As already noted, the intermediate portion of the element 30 is fixed to the conductor 29, but the ends of the element are forked to embrace one end of a conductor 31 with the element ends overlapping each other and positioned between abutment collars 32 and 32' provided on the conductor 31. Accordingly, when the element is heated by the resistances 12 and 21 and cooled, the conductor 31 will be shifted endwise toward the right and left, respectively, as viewed in Fig. 1.

The opposite end of the conductor 31 is provided with a switch contact 33 and adjacent thereto, an insulating collar 34 is secured on the conductor. A cross arm 35 is fixed on the collar 34 and extends in opposite directions from the axis of the conductor 31 to have pivotally connected to each end thereof one end of a link 36 whose opposite ends, respectively, are pivotally connected to the ends of a band spring 37 whose intermediate portion is fixedly connected to a collar 38 that is mounted on a conductor 39 within the casing 10. A coil spring 40 encircles the conductor 39, one end thereof abutting against the collar 38 and the opposite end being connected to a sleeve 41 that is slidable on the conductor 39 and carries a switch contact 42 positioned in operative relation to the contact 33. The other end of the conductor 39 is sealed through the adjacent end wall of the casing and is electrically connected to a terminal 43 which may be connected by a wire 44 to the terminal 13 or direct to the power line 24.

In describing the operation of my improved relay, it will be assumed that the switch contacts 33 and 42 occupy the open position shown in Fig. 1, corresponding to an open circuit position of the room thermostat 17. When the thermostat 17 closes in response to a demand for heat, for example, the electrical circuit through the resistances 12 and 21 is completed, so that these portions of the relay reduce the voltage at the thermostat and begin to emit heat which is received by the bimetallic element 30. The material selected for the resistances 12 and 21 may be such that the resistances become incandescent when current passes therethrough. By this arrangement, more heat is generated and the relay is characterized by quicker action. Tungsten or any of the materials customarily used as filaments in electric light bulbs may be employed for this purpose. Accordingly, the conductor 31 begins to shift toward the right and, because of the toggle-like relation between the links 36, cross arm 35 and band spring 37, the ends of the spring are forced outwardly against the spring tension until the conductor 31 has moved sufficiently to permit the ends of the spring to again approach each other with a sudden movement, and thus effect a snap engagement of the contacts 33 and 42. An electrical circuit is then completed from the power source through the motor 27 and this circuit remains in operation until the room thermostat 17 is satisfied, and at that time, the thermostat opens and breaks the circuit through the resistances 12 and 21 which thereupon begin to cool rapidly. The bi-metallic element 30 begins to contract and moves the conductor 31 toward the left to resume the position shown in Fig. 1. During the early phase of the latter action, engagement of the switch elements 33 and 42 is maintained by the spring 40 which, when the contacts are first engaged, yields slightly to provide a cushion for the endwise movement of the conductor 31. When the cooling has proceeded to a certain extent, the switch contacts 33 and 42 will be separated rapidly by the band 37 due to the toggle connection, thus reducing the possibility of excessive arcing between the contacts which would otherwise pit and corrode these portions of the relay.

The modification shown in Fig. 3 differs essentially from that illustrated in Fig. 1 by combining in one element the functions carried out by the resistance 12 or 21 and bimetallic element 30. As before, the numeral 45 designates the casing of the relay which is provided at one end with terminals 46, 47 and 48, corresponding, respectively, to terminals 14, 25 and 19 in Fig. 1, and at the opposite end with terminals 49, 50 and 51, corresponding respectively to terminals 13, 43 and 22. The corresponding terminals in Fig. 3 may be linked in a circuit arrangement as shown in Fig. 1.

The terminal 46 is electrically connected to a bimetallic strip element 52 that is located within the casing 45 and preferably arranged as a spiral, while the terminal 48 is similarly connected to a like element 53, the two elements being generally spaced from each other as indicated in Fig. 3 and embodying sufficient resistance to provide for the required voltage reduction. The opposite ends of the elements 52 and 53 are connected to a cross arm 54 composed of suitable insulation whose intermediate portion is fast upon a conductor 55 having a switch contact 59 which, in the relation of parts shown in Fig. 3, is spaced from a contact 60 that is electrically connected to a conductor 61 which extends outwardly of the casing for connection to the terminal 50. The material having the greatest coefficient of thermal expansion is located interiorly of each spiral thereby insuring an unwinding thereof when heated. Further, the spirals are wound in opposite directions so as to obtain the desired pushing action on the arm 54. The inner end of each spiral is fixed, while the outer and free end may be slotted to receive a headed pin 62 on the arm 54 and thus substantially avoid any turning effort on the arm. The combination of band spring and toggle arrangement for effecting a snap engagement and disengagement of the contacts 59 and 60 is generally indicated by the numeral 63 and this portion of the construction is similar to that illustrated in Fig. 1. The conductor 55 is connected by a wire 56 to the terminal 47, while the ends of the bimetallic elements 52 and 53 adjacent the ends of the cross arm 54 are connected by wires 57 and 58, respectively, to the terminals 49 and 51, respectively.

The operation of the relay illustrated in Fig. 3 is generally similar to that already discussed, except that when current is traversing the elements 52 and 53, their tendency to unwind shifts the cross arm 54 toward the right to thereby close the contacts 59 and 60. Snap disengagement of the contacts is effected in the manner already described for the relay shown in Fig. 1.

I claim:

1. An electrical system for regulating the circulation of water through a hot water heating system in response to demands for heat comprising a thermostat positioned to be affected by a radiator forming a part of the heating system, the thermostat being closed only when demanding heat for the radiator and open at all other times, a motor for operating a pump to control water circulation, a source of electrical power, and a relay electrically connected to the thermostat and source, the connection including a resistance for effecting a voltage drop whereby the voltage applied to the thermostat is low in comparison with the source voltage, electrical connections between the motor and the source and including a thermo-actuated element positioned to receive heat from the resistance, and switch means actuated to closure by the heated element.

2. An electrical system for regulating the supply of heat to a radiating means comprising a member responsive to temperature changes and positioned in operable relation to the radiating means, the temperature responsive means being closed only when demanding heat for the radiating means and open at all other times, and a relay having a resistance electrically connected to the temperature responsive means for effecting a voltage drop whereby the voltage applied to the temperature responsive member is low in comparison with the source voltage, a thermo-actuated element positioned to receive the heat from the resistance, and switch means actuated to closure by the heat element for controlling the passage of heat to the radiating means.

LAWRENCE J. SMITH.